US 6,535,644 B1

(12) United States Patent
Kurapati (10) Patent No.: US 6,535,644 B1
(45) Date of Patent: Mar. 18, 2003

(54) HIERARCHICAL FOVEATION BASED ON WAVELETS

(75) Inventor: Kaushal Kurapati, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/345,340

(22) Filed: Jul. 1, 1999

(51) Int. Cl.[7] .................................................. G06K 9/36
(52) U.S. Cl. ........................ 382/240; 382/232; 382/253; 375/240.01
(58) Field of Search ................................ 382/232, 240, 382/254, 239, 253; 348/400.1, 387.1; 358/433, 1.18; 660/558; 375/240.01; 345/555; 704/500, 229

(56) References Cited

U.S. PATENT DOCUMENTS

| | | | | |
|---|---|---|---|---|
| 5,060,170 A | * | 10/1991 | Bourgeois et al. | 364/521 |
| 5,103,306 A | * | 4/1992 | Weiman et al. | 358/133 |
| 5,282,255 A | * | 1/1994 | Bovik et al. | 382/232 |
| 5,638,498 A | * | 6/1997 | Tyler et al. | 395/117 |
| 5,649,032 A | * | 7/1997 | Burt et al. | 382/284 |
| 6,090,051 A | * | 7/2000 | Marshall | 600/558 |
| 6,160,846 A | * | 12/2000 | Chiang et al. | 375/240.05 |
| 6,252,989 B1 | * | 6/2001 | Geisler et al. | 382/232 |
| 6,345,126 B1 | * | 2/2002 | Vishwanath et al. | 382/253 |
| 6,351,335 B1 | * | 2/2002 | Perlin | 359/618 |

FOREIGN PATENT DOCUMENTS

WO  WO9833315  7/1998  ............ H04N/7/26

OTHER PUBLICATIONS

Said, A., "A New, Fast, and Efficient Image Codec Based on Set Partitioning in Hierarchical Trees", IEEE Transactions on Circuits and Systems for Video Technology, vol. 6, No. 3, Jun. 1996, pp. 243–250.*

* cited by examiner

Primary Examiner—Anh Hong Do (57) ABSTRACT

Different images, or sub-images, are rendered at different wavelet decoding rates, the more rapidly decoded wavelets forming a focal region about which less detailed images, or sub-images, are formed. In a preferred embodiment, sets of images or sub-images form levels of a hierarchy, and the wavelet encodings of these images and sub-images are decoded at rates associated with each level of the hierarchy. A single image may be partitioned into sub-images, or regions, that form each level of the hierarchy, or independent images may be arranged in a hierarchical manner, and subsequently rendered using a hierarchy of wavelet decoding schemes. The hierarchy can be developed at a remote site, and a hierarchical wavelet encoding can be transmitted to a local site, so that the hierarchical foveation effect can be rendered while the details of the lower levels of the hierarchy are being communicated.

20 Claims, 10 Drawing Sheets

HIERARCHICAL FOVEATION BASED ON WAVELETS

BACKGROUND OF THE INVENTION

1. Field of the Invention

This invention relates to the field of image processing systems, and in particular to the communication and presentation of wavelet encoded images.

2. Description of Related Art

There are several ways to process information hierarchically. Wavelets offer a highly efficient framework for representing and processing hierarchically structured information or processes. In general terms, a wavelet representation of a function consists of a coarse overall approximation together with detail coefficients that influence the function at various scales. In image processing, wavelet encodings are used to encode images via a hierarchy of terms.

A variety of alternative wavelet encoding techniques are common in the art. An example wavelet encoding technique that uses straightforward average and difference terms is presented herein for ease of understanding. Two image elements, such as two pixel values a, b, can be encoded as two other values, Q, Z, where $Q=(a+b)/2$, the average term, and $Z=(a-b)$, the difference term. To decode the values a, b, from the encodings Q, Z: $a=Q+Z/2$, and $b=Q-Z/2$. Four pixel values a0, b0, a1, a2 can be represented as two pair of encodings Q0, Z0, Q1, Z1, and the two average terms Q0, Q1 can be represented as encodings Q, Y, where Q is the average of Q0 and Q1, and Y is the difference between Q0 and Q1.

The use of wavelets offer a number of advantages and efficiencies. If all four pixel values are equal, the Q term will equal this value, and each of the difference terms Y, Z0, and Z1 will be zero. Techniques are common in the art for very efficient encodings and representations of zero-laden encodings. Note also that, because the Q term represents the average of the pixel values, the Q term can be used in place of the four pixel values until the difference terms Y, Z0, and Z1 are received and processed. That is, as the difference terms in a wavelet encoding are being processed, the average terms can be displayed, thereby presenting an image that iteratively becomes more and more detailed.

Figure 1:
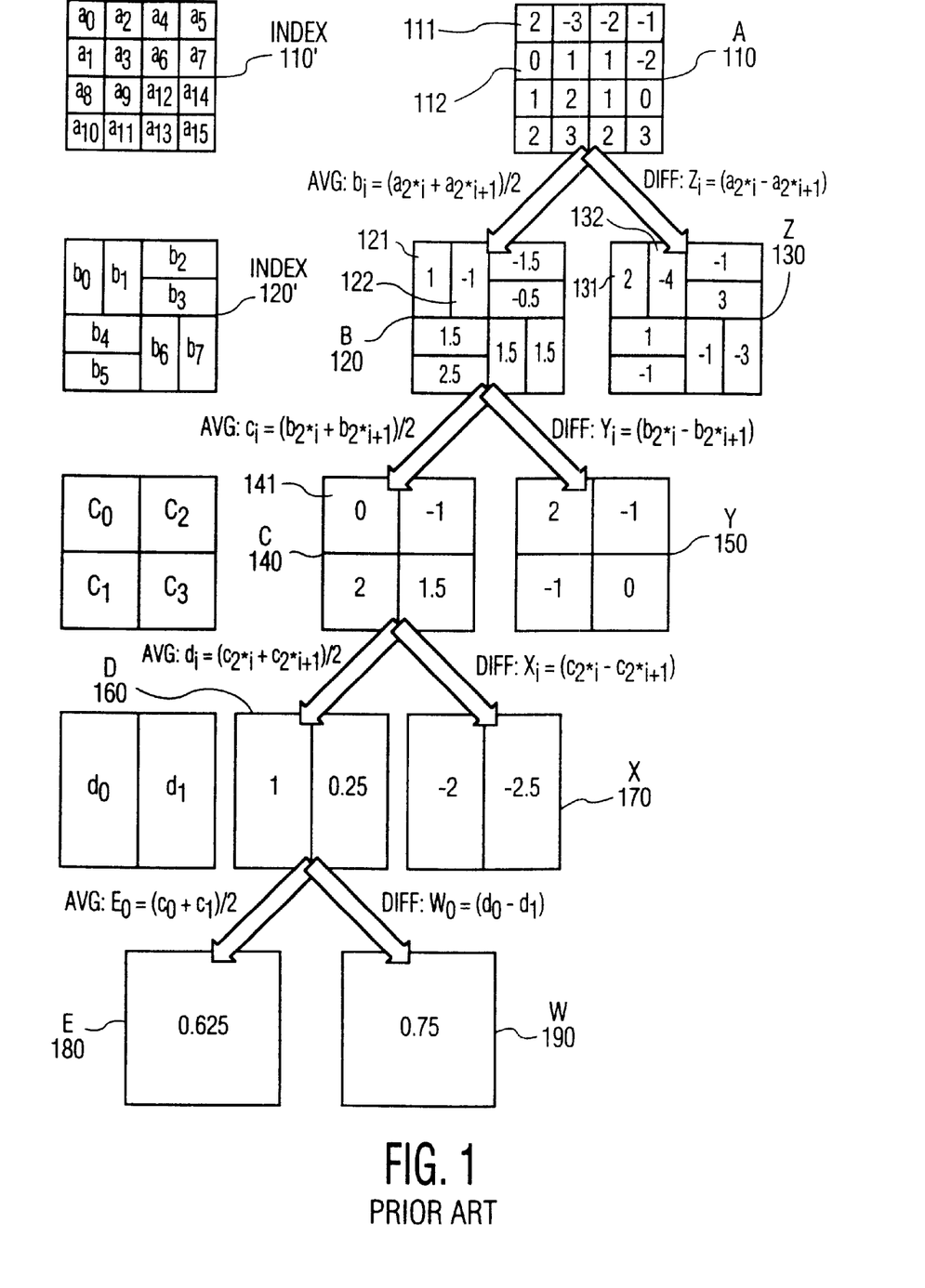
FIG. 1 illustrates an example prior art wavelet encoding of a sixteen element image.

FIG. 1 illustrates an example wavelet encoding of a sixteen element block A 110, each element 111, 112, . . . representing, for example, the value of a picture element (pixel) for rendering on a display screen. An index block 110' is shown in FIG. 1 for ease of reference to the individual elements of block A 110. That is, the upper left element 111 of block A 110 is referenced as $a_0$, the next lower element 112 is referenced as $a_1$, and so on.

Blocks B 120 and Z 130 represents the average and difference blocks corresponding to a pair-wise encoding of the individual elements of the block A 110. That is, cell $b_0$ 121 of block B 120 represents the average of elements $a_0$ 111 and $a_1$ 112, and cell Z0 131 of block Z 130 represents the difference of elements $a_0$ 111 and $a_1$ 112.

Blocks C 140 and Y 150 represents the average and difference blocks corresponding to a pair-wise encoding of the individual elements of the block B 120. That is, cell $c_0$ 141 of block C 140 represents the average of elements $b_0$ 121 and $b_1$ 122, and cell Y0 151 of block Y 150 represents the difference of elements $b_0$ 121 and $b_1$ 122.

In like manner, blocks D 160 and X 170 represent the average and difference blocks corresponding to block C 140, and blocks E 180 and W 190 represent the average and difference blocks corresponding to block D 160.

As discussed above, each of the cells of blocks E 180, D 160, C 140, and B 120 represent the average value of the pixel elements of block A 110 contained within the respective cell. The single cell of block E 180, for example, has a value of 0.625, which is the average of all the pixel elements of block A. The upper left cell $c_0$ 141 of block C 140 has a value of 0, which is the average of all the pixel elements of block A in the upper left region $((2+0+(-3)+1)/4)$. Thus, a display of blocks E 180, D 160, C 140, B 120, and A 110, in that order, will present a progressively more detailed, or finer-resolution, view of the image represented by the pixel elements of block A 110.

Note that the values of the cells of the block D 160 can be determined from the value of block E 180 and W 190, as discussed above, and as illustrated in FIG. 2. That is, $d_0=E+W/2$, and $d_1=E-W/2$. In like manner, the value of the cells of block C 140 can be determined from the value of this determined block D 160 and the difference block X 170; block B 120 can be determined from C 140 and Y 150; and block A 110 can be determined from B 120 and Z 130. Thus, the communication of blocks E 180, W 190, X 170, Y 150, and Z 130 is sufficient to communicate the sixteen element values $a_0$–$a_{15}$ of block A 110. Note also that the blocks E 180 and W 190 contain one value each; X 170 contains two values; Y 150 contains four values; and Z 130 contains eight values. Thus, the communication of blocks E 180, W 190, X 170, Y 150, and Z 130 require the communication of a total of sixteen values, the same number of values contained in the original block A 110.

Wavelets are commonly used to communicate images so that increasingly more detailed views of the image can be displayed while the more detailed information is being received. This provides the advantage of providing a distraction to the viewer while the image is being downloaded, as well as to allow the user to terminate the transmission when it is determined that a sufficient amount of detail has been communicated.

BRIEF SUMMARY OF THE INVENTION

It is an object of this invention to exploit the progressive-resolution characteristics of wavelets to provide a rendering of an image, or images, that takes advantage of the human perceptive system.

As is known in the field of art, a human's visual field is typically drawn to a focal point, or focal area, within a scene. As the radial distance from that focal area increases, the human perceives less and less detail. This phenomenon is termed foveation. Artists purposely add a detail or feature to define such a focal point, to either bring the user's attention specifically to the feature, or to put the scene in proper perspective, or to diminish the distracting effects caused by a lack of focus. Commercial artists take advantage of this phenomenon in advertising to draw the viewer's attention to the item being advertized. Internet advertising is becoming increasingly popular, with multiple advertisers typically vying for a viewer's attention. Copending U.S. patent application "EVOLVING ADVERTISEMENTS VIA AN EVOLUTIONARY ALGORITHM", U.S. Ser. No. 09/277,650, filed Mar. 26, 1999, for J. David Schaffer, provides a method for evaluating and evolving an advertising campaign based on measures of viewer interest, including the number of users who select the advertised page, and so on, and is included by reference herein.

In like manner, computer applications are being developed to assist users in locating items of potential interest among a multitude of available items. Copending U.S. patent application "DEVICE AND METHOD FOR A LATTICE DISPLAY", U.S. Ser. No. 09/282,321, filed Mar. 31, 1999, for Jacquelyn Martino, Nevenka Dimitrova, and Kaushal Kurapati, presents a system for displaying multiple images in a hierarchical manner, depending upon a measure of each image's potential interest to the viewer, and is incorporated by reference herein. In this referenced patent application, images having a high potential interest to the user are presented with more prominence than others, where prominence is effected via the image's size, location, resolution, brightness, border trim, and so on.

The expressed object of this invention, and others are achieved by providing a method and apparatus for rendering wavelets in a hierarchical manner. Different images, or sub-images, are rendered at different wavelet decoding rates, the more rapidly decoded wavelets forming a focal region about which less detailed images, or sub-images, are formed. In a preferred embodiment, sets of images or sub-images form levels of a hierarchy, and the wavelet encodings of the images or sub-images are decoded at rates associated with each level of the hierarchy. A single image may be partitioned into sub-images, or regions, that form each level of the hierarchy, or independent images may be arranged in a hierarchical manner, and subsequently rendered using a hierarchy of wavelet decoding schemes. The hierarchy can be developed at a remote site, and a hierarchical wavelet encoding can be transmitted to a local site, so that the hierarchical foveation effect can be rendered while the details of the lower levels of the hierarchy are being communicated.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

Figure 3A:
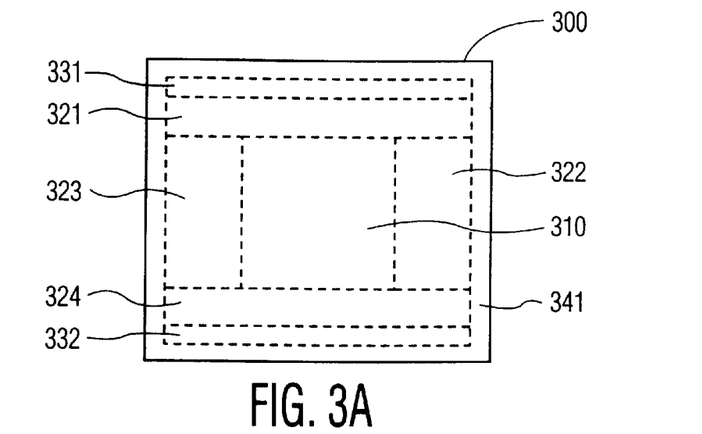
FIGS. 3A–3F illustrate an example hierarchical foveation based on wavelets in accordance with this invention.

FIGS. 3A–3F illustrate an example hierarchical foveation based on wavelets in accordance with this invention. FIG. 3A represents a display area 300 for an image (not shown). In accordance with this invention, the display area 300 is partitioned into a number of regions 310–341. The regions 310–341 are arranged in a hierarchical manner. The center region 310 is the focal region, or top level of the hierarchy; the regions 321–324 about the center region 310 form the next level of the hierarchy; the regions 331–332 form the next level; and region 341 forms the lowest level. The dashed lines outlining the regions 310–341 are used to indicate that an image is not yet presented on the display area 300.

Figure 2:
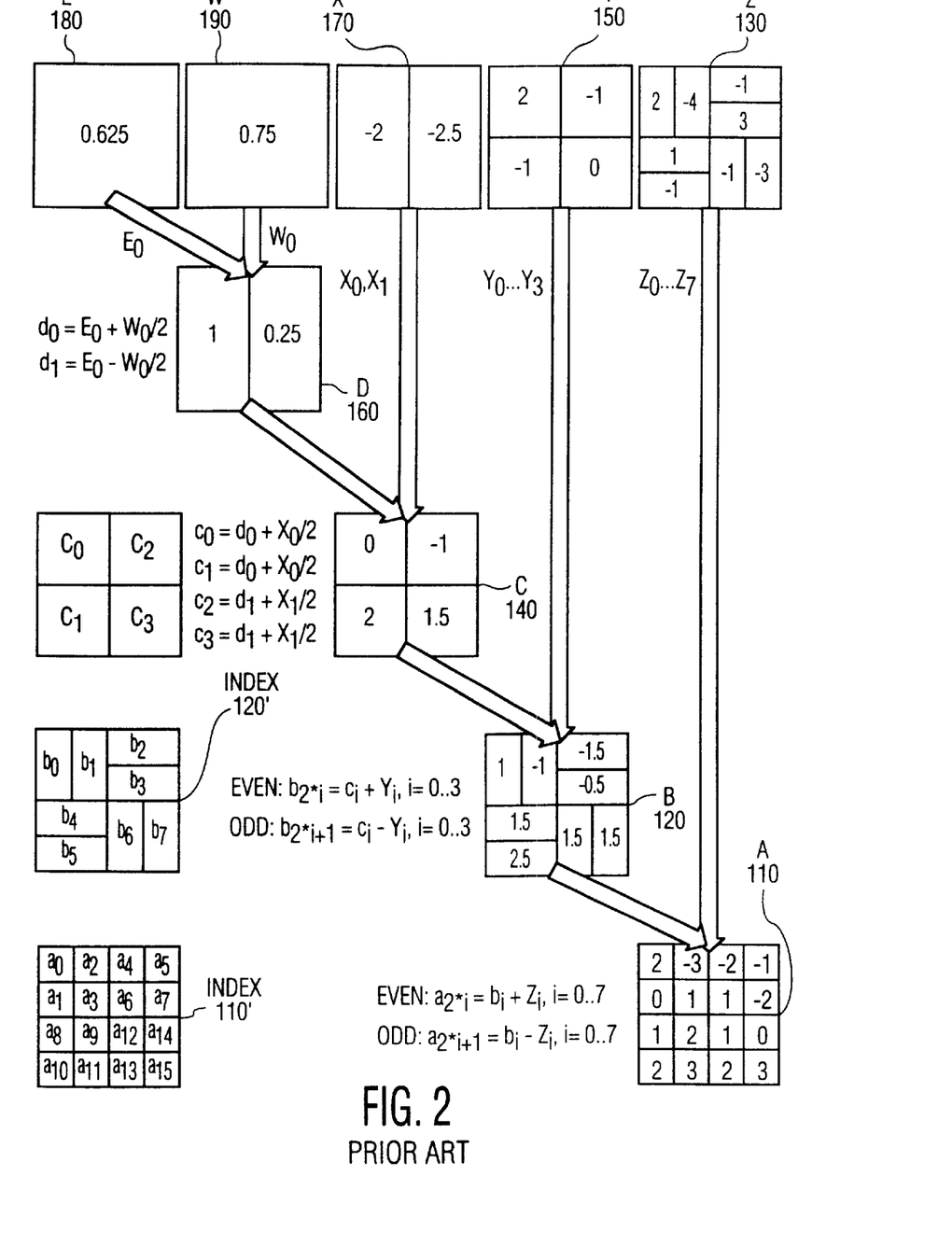
FIG. 2 illustrates an example prior art wavelet decoding of a sixteen element block.
Figure 3B:
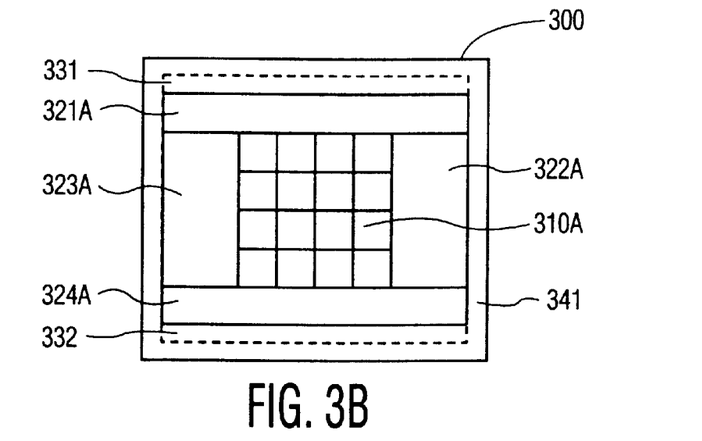
Figure 3C:
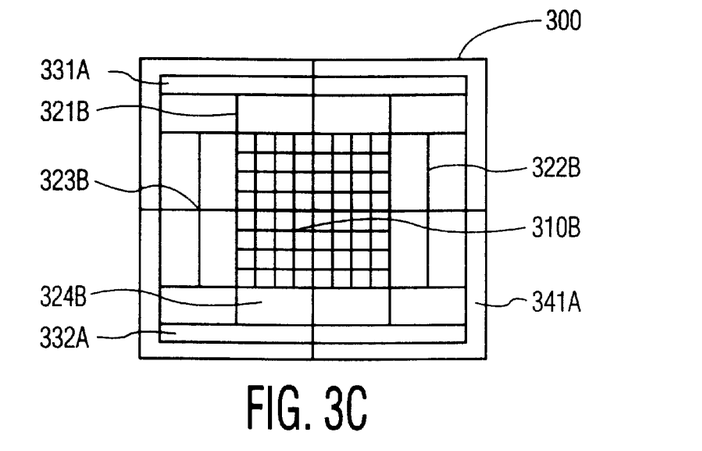
Figure 3D:
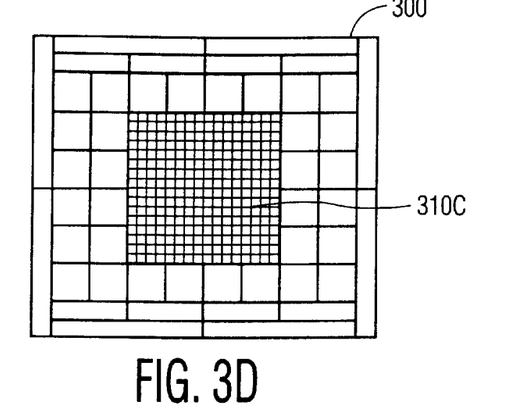
Figure 3E:
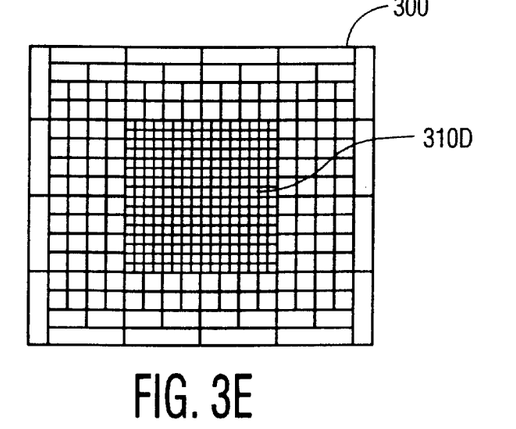
Figure 3F:
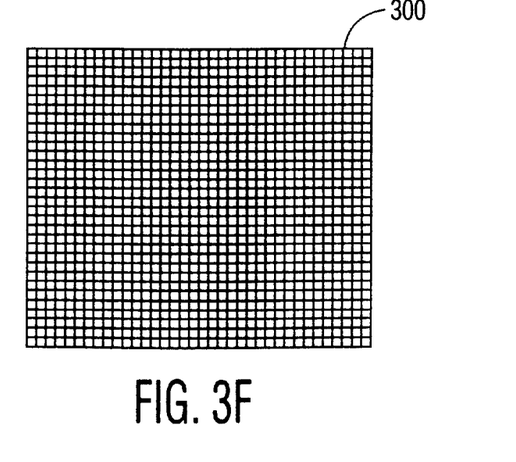
Figure 4A:
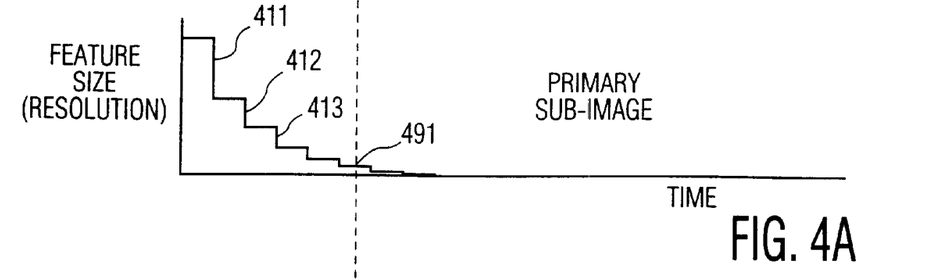
FIG. 4 illustrates example timing diagrams of hierarchical progressively finer resolution renderings at each of four levels of an image hierarchy.
Figure 4B:
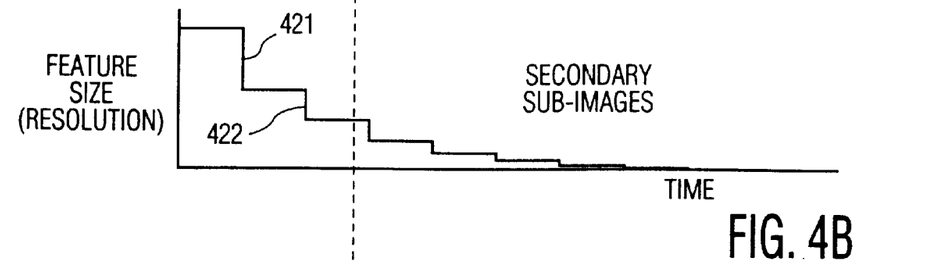
Figure 4C:
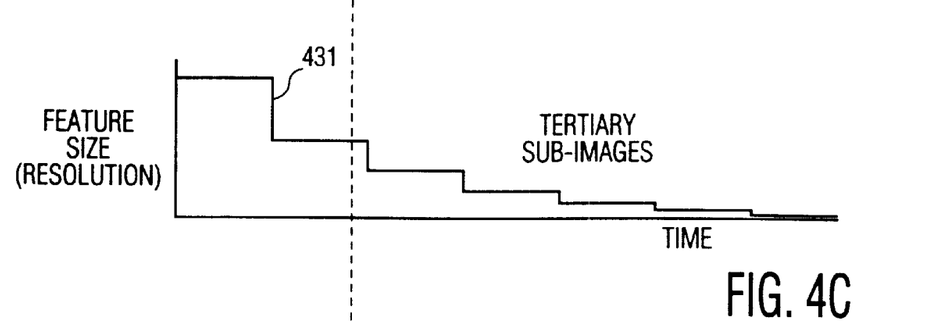
Figure 4D:
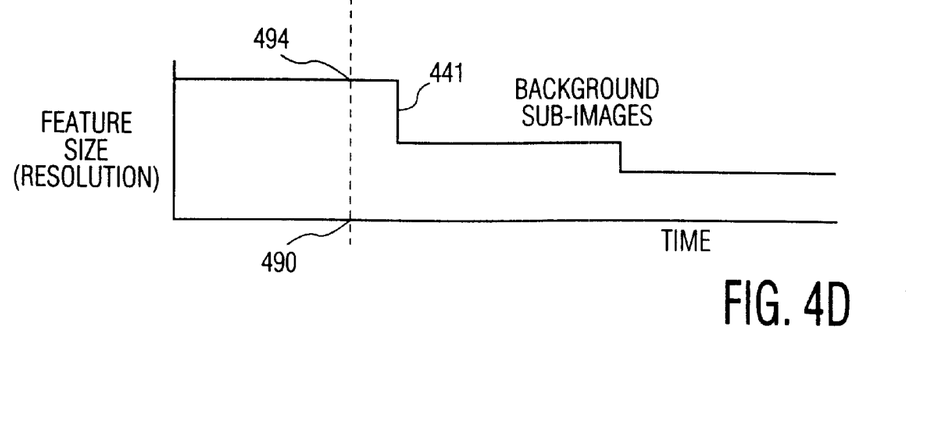

FIGS. 3B–3F illustrate the display area 300 at subsequent intervals of time. FIG. 3F representing a final rendering of an image (not shown) in the display area 300. The discrete cells in each FIG. representing the resolution of the rendering in each region, similar to the partitionings of blocks A, B, C, D, and E of FIGS. 1 and 2. The smaller the cell, the finer the resolution.

Illustrated in FIG. 3B, the highest level region 310 is partitioned into sixteen cells. The region is labeled 310A, for ease of reference; each region is similarly annotated when a change occurs within the region, compared to the prior FIG. The next level regions 321A–324A each comprise a single cell, similar to block E of FIGS. 1 and 2. As discussed above, each cell at this level of abstraction will represent the average value of the lower level cells, or pixels, of the image. Thus, each of the regions 321A–324A, for example, will be rendered as a single uniform color, if the values of the lowest level cells represent the color of each pixel. Region 310A, on the other hand, will be rendered as a patchwork of sixteen regions of color, representing the average value of the pixels within each of the sixteen regions. That is, the image segment in region 310A are rendered at a finer resolution than the image segments within regions 321A–324A. The remaining regions 331, 332, 341 are outlined by dashed lines, indicating that the image segments at these regions are not yet rendered.

FIG. 3C illustrates the display area 300 at a later time. As illustrated, region 310B comprises sixty-four cells; regions 321B–324B comprise four cells each; regions 331A, 331B comprise two cells each; and region 341A also comprises two cells. As illustrated by the area of each cell, region 310B has a finer resolution than regions 321B–324B, which have finer resolution than regions 331A, 331B, which have finer resolution than region 341A.

In like manner, FIGS. 3D–3F illustrate progressively finer resolutions for each of the regions. Note that once the region 310C reaches the finest resolution, it remains at this resolution through subsequent renderings, until all regions achieve this finest resolution, at FIG. 3F. As will be seen from the details presented further, the time required to render the finest resolution at FIG. 3F will be only slightly longer than the conventional rendering of a single wavelet representation of the entire display area 300.

As illustrated in the sequence 3B–3F, the focal region 310 is rendered at a finer resolution than the surrounding regions as the image is progressively rendered, until all regions are rendered at the finest resolution, illustrating the finest detail. This is particularly beneficial if the time duration between renderings is long. As would be evident to one of ordinary skill in the art, each of the illustrated renderings FIG. 3B–3F can be expected to require progressively longer rendering time durations, because each sequential rendering is likely to contain progressively more cells to process. Thus, by presenting the fully detailed rendering in region 310C at FIG. 3D, before the fully detailed rendering of the entire image, at FIG. 3F, allows the viewer to focus on the focal region 310C sooner than a conventional rendering using a single wavelet representation of the entire display area 300.

The detailed presentation of the focal region 310C sooner than the entire image, in accordance with this invention, provides for a number of advantages. Because the human visual system naturally includes foveation, as discussed above, the presentation of less detail in peripheral regions will be less noticeable, and therefore the perceived reception speed will be improved. That is, for example, the time of the rendering of FIG. 3E may be perceived as the "completion" of the reception of the image, and the filling in of the details in the peripheral regions for FIG. 3F may proceed virtually unnoticed, unless the viewer specifically focuses on the peripheral regions. Also, as noted with regard to prior art sequential renderings, the rendering can be terminated as soon as the viewer determines that sufficient information has been received. This is particularly useful for terminating a download of an image when it is determined that the image is not an image that the viewer desired. As compared to the prior art system, however, because the focal region 310 is presented at finer resolutions more quickly than the entire image, a recognition of whether the image is one that the user desired will generally occur more quickly. Other advantages are discussed further below.

FIG. 4, lines 4A–4D illustrate example timing diagrams of hierarchical progressively finer resolution renderings at each of four levels of an image hierarchy. For ease of reference, the term sub-image is used hereinafter to refer to the portions of the overall image that is displayed in the aforementioned partitioned regions of the display. Line 4A illustrates the resolution of the primary sub-image, the sub-image that is rendered in the aforementioned primary, or focal, region, such as region 310 in FIG. 3. Typically, there will be one primary sub-image and one primary region that serves as the focal point, although multiple sub-images and primary regions may be defined at the upper level of the hierarchy for other applications of this invention. Line 4B illustrates the resolution of the secondary sub-images, corresponding to the regions at the next level of the hierarchy, such as regions 321–324 of FIG. 3. Line 4C illustrates the resolution of the tertiary sub-images, and line 4D illustrates the resolution of the background sub-images, at the last level of the hierarchy. The vertical scale of each line 4A–4D represents the resolution, in terms of the finest feature size that can be rendered at that resolution, consistent with the size of the cells in the regions of FIG. 3. Each of the illustrated steps is a reduction of feature size by half, consistent with the processing of each wavelet difference set W, X, Y and Z of FIG. 2, discussed above. As illustrated, the primary sub-image is processed to provide finer resolutions, at 411, 412, 413, . . . , sooner than the secondary sub-images, at 421, 422, . . . , and sooner than the tertiary sub-images, at 431, and the background sub-images, at 441.

At any point in time 490, a rendering of the resolved sub-images can be effected. As illustrated in FIG. 4, at time 490, each of the hierarchical levels of sub-images have different resolutions, the finer resolution 491 being available at the top level of the hierarchy, and the coarser resolution 494 at the lowest level of the hierarchy.

Figure 5:
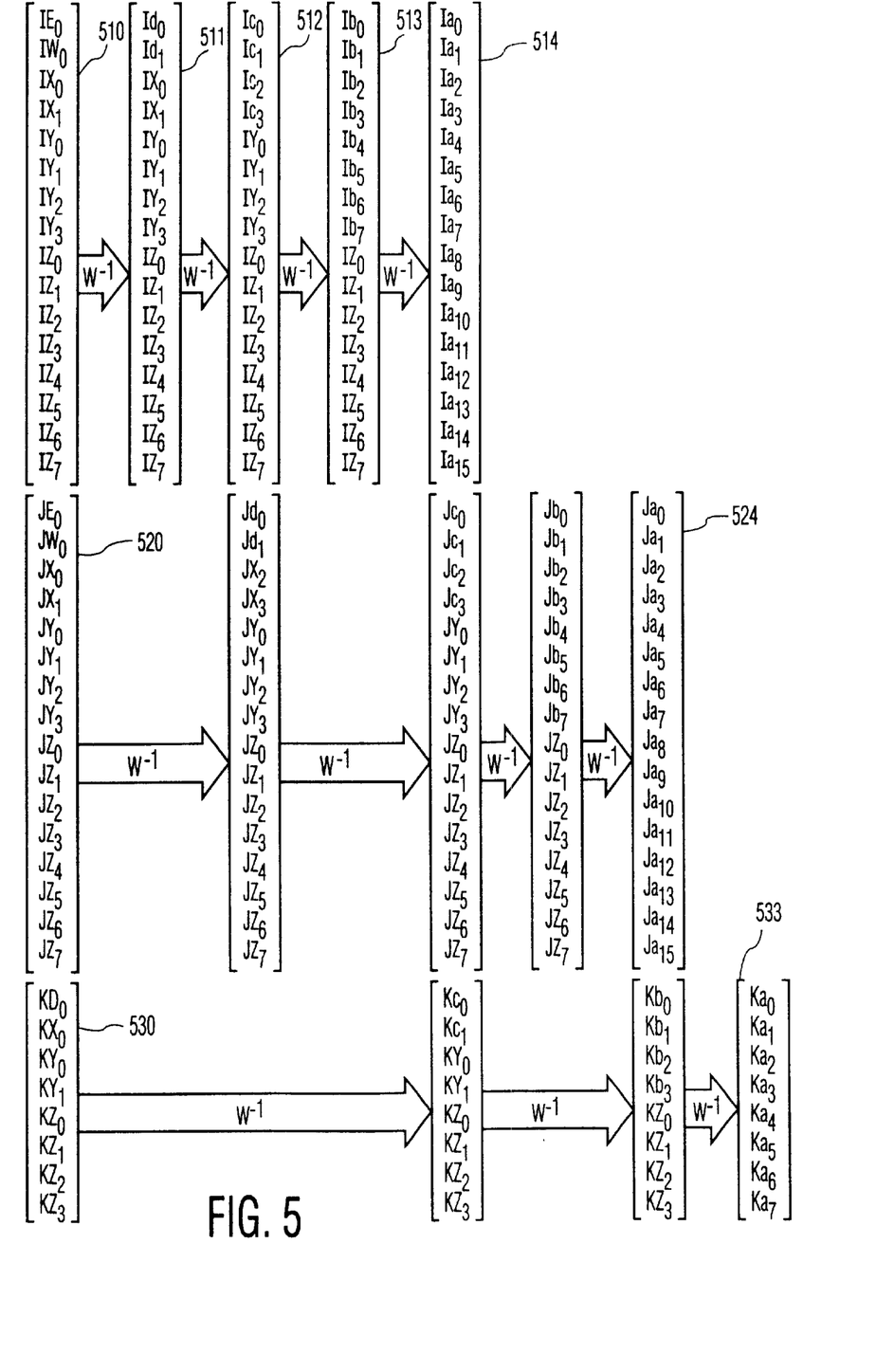
FIG. 5 illustrates an example wavelet decoding sequence to effect a hierarchical progressively finer resolution renderings in accordance with this invention.

FIG. 5 illustrates an example wavelet decoding sequence to effect hierarchical progressively finer resolution renderings in accordance with this invention. The horizontal axis represents time. The sets 510, 511, . . . illustrate wavelet encodings, corresponding to the examples given in FIGS. 1 and 2. Set 510 corresponds to a wavelet encoding of a first sub-image I comprising sixteen pixels (one average, $E_0$, and fifteen difference terms corresponding to sets W, X, Y, and Z); set 520 corresponds to a wavelet encoding of a second sub-image J comprising sixteen pixels; and set 530 corresponds to a wavelet encoding of a third sub-image K comprising eight pixels. Sub-image I is representative of each sub-image at the top of the hierarchy; sub-image J is representative of each sub-image at the next level of the hierarchy; and sub-image K is representative of each sub-image at the following level of the hierarchy.

Set 510 is decoded to produce a once-decoded set 511, corresponding to the above described formation of the D set of averages from the E average and the difference W in FIG. 2. The first two elements of the resultant once-decoded set 511, $Id_0$ and $Id_1$, are the average values of the two-cell partition of the region assigned to the sub-image I. The once-decoded set 511 is decoded to produce a twice decoded set 512. The first four elements $Ic_0$–$Ic_3$ of the resultant twice-decoded set 512 correspond to the four-cell partition of the region assigned to sub-image I. Subsequent decodings eventually produce the set 514 of pixel values $Ia_0$–$Ia_{15}$ of sub-image I.

Sets 520 and 530 are similarly sequentially decoded to produce sets 524, 533 of pixel values of sub-images J and K, respectively. Note that in accordance with this invention, the rates of decoding of the sub-images J and K are progressively slower than the rate of decoding of the primary sub-image I. That is, at the time that sub-image I has been twice-decoded, to produce four average values, sub-image J has only been once-decoded, to produce two average values, and sub-image K has not yet been decoded, and has a single average value. As illustrated in FIG. 5, the rate of decoding sub-image J is half the rate of decoding sub-image I, until sub-image I is fully decoded, and the rate of decoding sub-image K is half the rate of decoding sub-image J, until sub-image J is fully decoded. The particular values of decoding rates, and other decoding parameters, are optional. For example, the rate of decoding of each level can be equal, but the foveation hierarchy is maintained by initiating the sequential decoding of each level at a progressively later time. Of significance to the foveation aspect of this invention is that the primary sub-image(s) should be decoded to produce a resolution that is finer than the other levels of the hierarchy. Other techniques may be applied as well; for example, interesting visual effects may be provided by dynamically determining which sub-images to decode based on a random, or semi-random process.

Figure 6:
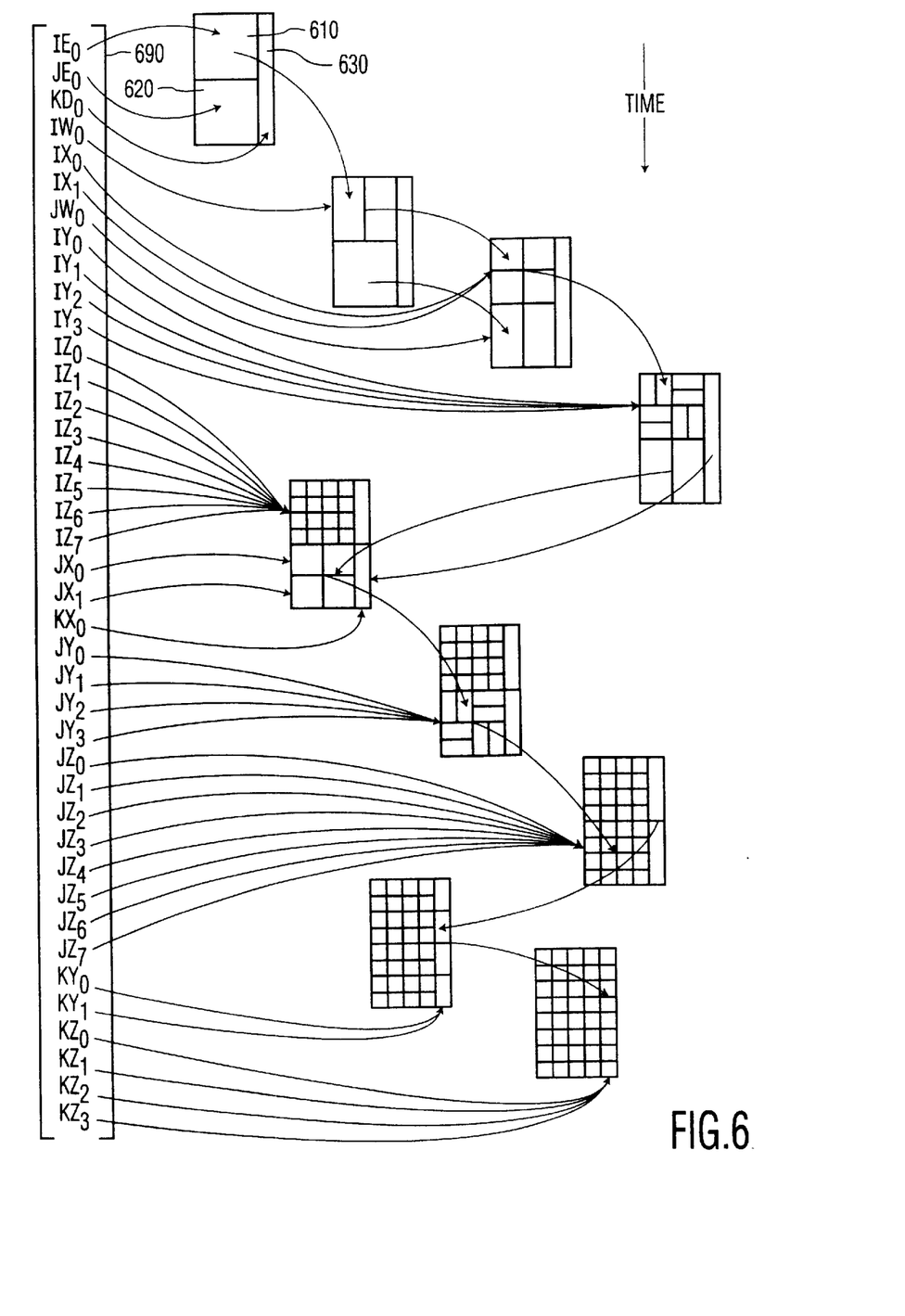
FIG. 6 illustrates an example alternative wavelet decoding sequence to effect a hierarchical progressively finer resolution renderings in accordance with this invention.

Note that, in FIG. 5, the decoding processes uses the "upper" N elements of the current set to produce the next set of average N elements. That is, decoding set 510 to set 511 utilizes the upper two elements $IE_0$, $IW_0$ to produce the average values $Id_0$ and $Id_1$; the remaining fourteen elements remain unchanged from set 510 to set 511. In like manner, determining the four next average values $Ic_0$–$Ic_3$ of set 512 only requires the upper four elements of set 511. FIG. 6 illustrates an example alternative wavelet decoding sequence to effect a hierarchical progressively finer resolution renderings in accordance with another aspect of this invention. The set 690 includes all of the elements of the sets 510, 520, and 530 of FIG. 5. The order of the elements in the set 690, however, is the order in which the elements are to be decoded for rendering. Illustrated in FIG. 6 is a display area 600 having three regions 610, 620, 630 for displaying the images I, J, and K, respectively. The first three elements of set 690, $IE_0$, $JE_0$, and $KD_0$, are the single average values associated with each image I, J, and K, and apply to each of the three regions 610, 620, and 630, respectively. The next element $IW_0$ in the set 690 is the first difference term of image I, and is used in conjunction with the average $IE_0$ to partition region 610 into two cells, of average values $Id_0$ and $Id_1$, as discussed above relative to FIG. 5. The next two elements $IX_0$ and $IX_1$ are used in conjunction with the average values $Id_0$ and $Id_1$ to subsequently partition region 610 into four cells of average values $Ic_0$–$Ic_3$, as discussed above. Note that the next element $JW_0$ is the value of the first difference of the sub-image J, and that it occurs in the set 690 before the remaining elements $IY_0$–$IZ_7$ associated with the sub-image I. Referring to the time sequence illustrated in FIG. 5, the first decoding 521 of the J image occurs before the third decoding 513 of image J, and thus, in accordance with this aspect of the invention, the element $JW_0$ needed to effect the first decoding of the image J occurs in the set 690 before the elements $IY_0$–$IY_3$ needed to effect the third decoding of the image I. In like manner, each element in the set 690 occurs in the hierarchical order in which it is needed to effect the hierarchical decoding in accordance with this invention.

The hierarchical ordering of the elements from multiple sub-images provides for a number of advantages. As illustrated in FIG. 6, the hierarchically ordered set 690 can be processed sequentially to produce increasingly detailed sub-images in the display area 600. Thus, if the ordered set 690 is being sequentially transmitted from a remote location, the rendering to the display area 600 can commence while subsequent elements are being transmitted, thereby producing a viewable image before all the details of the image are received. As noted above, if the hierarchical encoding is a foveation-based hierarchy, the speed of recognition of the overall image, based on the details of the focal area, will also be faster. Other advantages are presented below.

Figure 7:
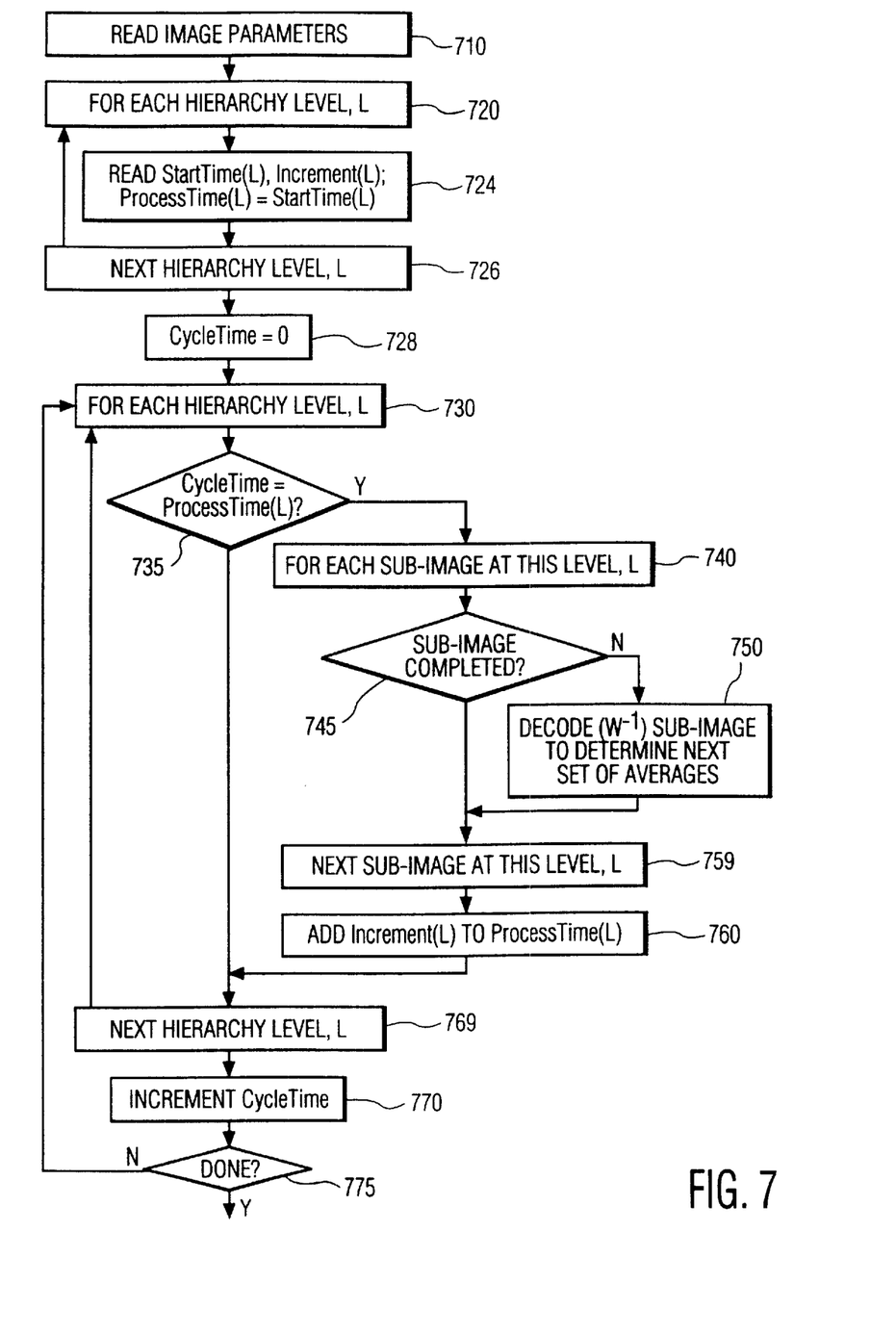
FIG. 7 illustrates an example flow diagram for a hierarchical wavelet rendering system in accordance with this invention.

FIG. 7 illustrates an example flow diagram for a hierarchical wavelet rendering system in accordance with this invention. At 710, the sub-image parameters for each sub-image are read. These parameters include, for example, the hierarchy level of each sub-image, the location within the regions allocated for the hierarchy level for rendering each sub-image, the number of sets of differences corresponding to each sub-image, and so on. The loop 720–726 reads, at 724, the parameters associated with each hierarchy level. These parameters include when to start the decoding of sub-images at this level of the hierarchy, relative to the commencement of the wavelet decoding process, and the time increment between subsequent decodings. As is common in the art, these "time" parameters are specified in terms of "cycles" through the decoding process. The cycle count, or cycle-time, is initialized to zero, at 728.

The loop 730–769 effects the decoding and rendering process for each level of the sub-image hierarchy. At 735, the next scheduled time to process images at each level of the sub-image hierarchy is compared to the current cycle time. If the times match for a particular hierarchy level, at 735, the loop 740–750 processes each sub-image within the particular hierarchy level. If, at 745, the sub-image has not yet been completely decoded, it is decoded once to produce the next set of partitioned cell-averages for this sub-image, at 750.

After all the sub-images at this hierarchy level are process, the next scheduled process time for the hierarchy level is updated, at 760. After all the hierarchy levels are processed, the cycle time is incremented and the process is repeated until, at 775, all the sub-images have been decoded. At any time during the process of FIG. 7, the decoded averages of each sub-image can be rendered, thereby providing a progressively finer display of the sub-images while the lower level details are being determined, as discussed above.

Figure 8A:
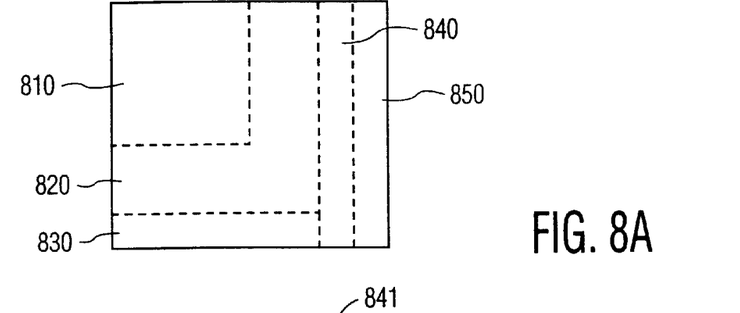
FIGS. 8A–8D illustrates an example hierarchical rendering of multiple images in accordance with this invention.
Figure 8B:
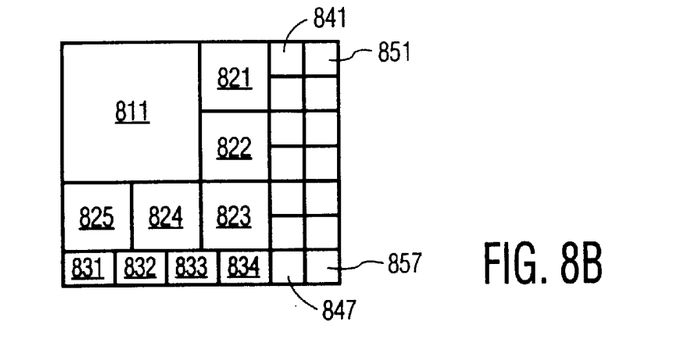

FIGS. 8A–8D illustrates an example hierarchical rendering of multiple images. As noted above, copending U.S. patent application "DEVICE AND METHOD FOR A LATTICE DISPLAY", U.S. Ser. No. 09/282,321, filed Mar. 31, 1999, for Jacquelyn Martino, Nevenka Dimitrova, and Kaushal Kurapati, presents a system for displaying multiple images in a hierarchical manner, by rendering images at the upper levels of the hierarchy more prominently than images at the lower levels. In one embodiment of the referenced invention, images are related to one another in a lattice network; for example, images of a scene from a television broadcast are related to images of other scenes from the same broadcast, images of the same actor in a different broadcast, images of other broadcasts by the same director, and so on. When an image is selected as the primary image, the prominence of all of the images related to the selected image is determined based on the relative strength of the relationship of each image to the selected image. The strength is determined, for example, by the minimum number of links connecting the images in the lattice network. FIG. 8A illustrates a partitioning of a display area 800 into five regions 810, 820, 830, 840, and 850, each region respectively corresponding to progressively lower levels in a hierarchy. FIG. 8B illustrates a further partitioning of each area 820–850 of FIG. 8B, corresponding to image locations 821–825 in region 820, 831–834 in region 830, 841–847 in region 840, and 851–857 in region 850. There are a total of twenty-four image locations identified in FIG. 8B, including the primary image location 811 in region 810. In accordance with the referenced invention, using this partitioning of twenty-four image locations, the twenty-three images most closely related to the primary image are allocated the locations 821–857 in the order of their closeness to the primary image, which is allocated to location 811. Each image is allocated a specific location 811–857, and appropriately cropped or letter-boxed to conform to the aspect ratio of each location 811–857. That is, each of the twenty-four images correspond to twenty-four sub-images of an overall image provided to the display area.

Figure 8C:
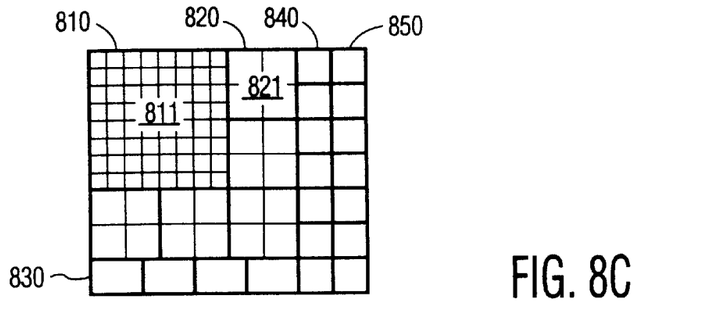
Figure 8D:
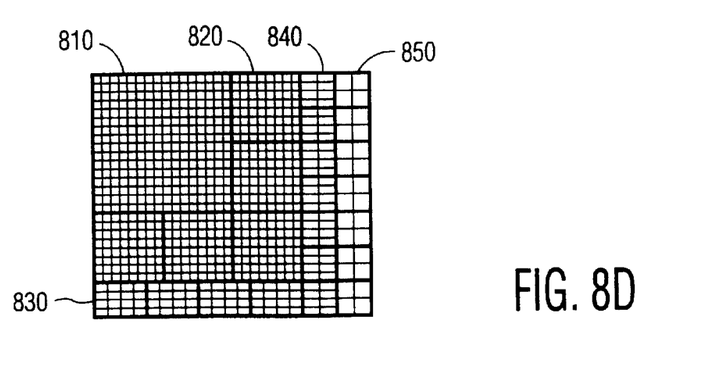

FIGS. 8C and 8D illustrates sequential rendering of the multiple images, using the principles discussed above. FIG. 8D illustrates another advantage of the hierarchical encoding process discussed above. If the finest resolution of the display 800 is as illustrated in regions 810 and 820 of FIG. 8D, there is no need to communicate further details for the images corresponding to these regions. The 256 cells of region 810, for example, represent an 8-times wavelet decoding of the image at location 811. Sets of wavelet differences beyond the $8^{th}$ level of encoding need not be communicated. The sixty-four cells each image location 821–825 of region 820 represent a 6-times wavelet decoding of the images at each location 821–825. Therefore, sets of wavelet differences beyond the $6^{th}$ level of encoding need not be communicated for these images. Alternatively, the $7^{th}$ and $8^{th}$ levels of encoding for the images of location 821–825 can be communicated after the time that FIG. 8D is rendered, and stored in a local buffer. When a user subsequently selects an image from the locations 821–825 as the primary image for rendering at location 811, for example, these additional levels of decoding will be available in the local buffer for the selected image, allowing for a rapid rendering of the selected image at the finer resolution of location 811. In like manner, the wavelet encodings can be purposely truncated to limit the bandwidth required to communicate the multiple images. In such an embodiment, for example, the resolution illustrated in FIG. 8D can be a purposeful final display, with a variety of resolutions, wherein the details of an image are not fully communicated unless the image is one of the images assigned to a relatively high position 710, 720 in the display hierarchy.

Figure 9:
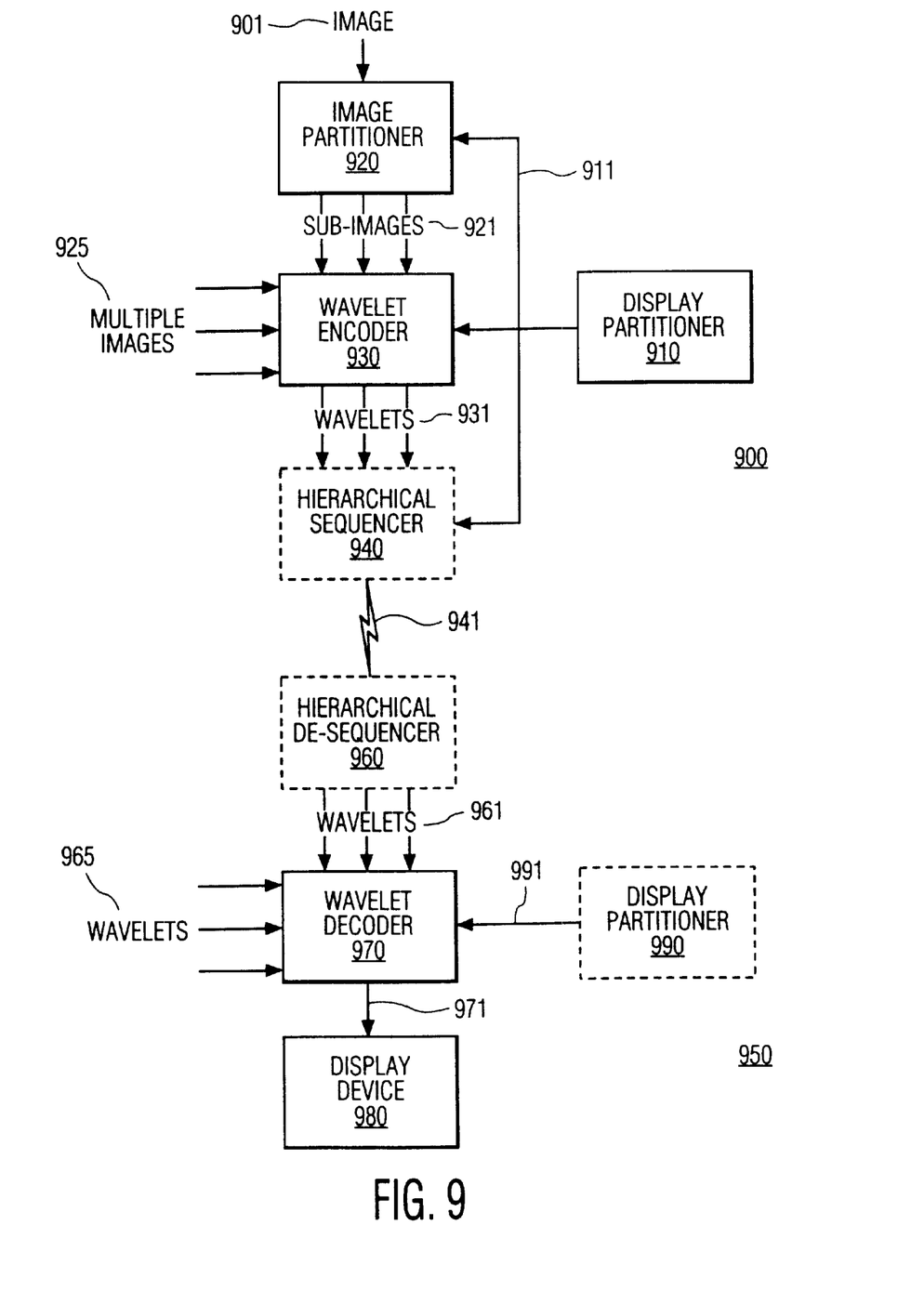
FIG. 9 illustrates an example block diagram of a hierarchical wavelet processing system in accordance with this invention.

FIG. 9 illustrates an example block diagram of a hierarchical wavelet processing system in accordance with this invention. The wavelet processing system includes an encoding system 900 and a decoding system 950. A display partitioner 910 partitions a display area into a plurality of regions, and provides the parameters associated with the partitioning 911 to an image partitioner 920. The partition parameters 911 include, for example, the location of the each region on the display, the size of each region, the hierarchy level associated with each region, and the like. The image partitioner 920 partitions an image 901 into sub-images 921 that correspond to the display partitions defined by the parameters 911, as discussed above. The sub-images 921 are provided to a wavelet encoder 930 that creates a wavelet encoding 931 for each sub-image 921. Alternatively, multiple images 925 can be provided to the wavelet encoder 930, and each of the multiple images 925 are encoded by the wavelet encoder 930 to correspond to the display partitions to correspond to the display parameters 911, as discussed above. Optionally, the individual wavelet encodings 931 can be organized for communication to the decoder 950 in a hierarchical order, as discussed above, by a hierarchical sequencer 940 to provide a hierarchical transmission 941 that is de-sequenced by a hierarchical de-sequencer 960 in the decoder 950.

A wavelet decoder 970 receives wavelets 961 corresponding to the encoded wavelets 941. In a preferred embodiment, the display partition parameters 911 are implicitly included in communicated wavelets 961, for example, via a header to each wavelet that specifies where the wavelet is to be rendered in the display area. The wavelet decoder 970 decodes the wavelet encodings 961 using the techniques disclosed above, and provides the resultant renderings to a display device 980. Optionally, the wavelet decoder 970 receives independent wavelets 975 that are rendered to the display device 980 in dependence upon a local display partitioner 990. That is, typically the display partitioning and wavelet encoding in accordance with this invention occur at a server processor, and the wavelets corresponding to each partition are communicated to a client processor. Alternatively, wavelets may be communicated to the client processor in a conventional manner, and the local display partitioner 990 provides the parameters 991 for decoding each wavelet using varying rates of decoding, as discussed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in a preferred embodiment, the images and regions are organized in a hierarchical fashion. A hierarchical structure facilitates algorithmic processing techniques. Other, non-hierarchical, partitionings of the display or of the images can provide for wavelet encodings with differing orderings or rates of decoding in accordance with this invention. The examples provided in the figures are presented for illustration purposes other system configuration and optimization features will be evident to one of ordinary skill in the art in view of this disclosure, and are included within the scope of the following claims.

I claim:

1. An encoder system comprising:
 a display partitioner that partitions a display area into a plurality of regions, each region having associated parameters, and
 a wavelet encoder that encodes a plurality of sub-images to produce a plurality of wavelet encodings in dependence upon the parameters associated with each region,
 wherein said wavelet encoder encodes at a first encoding rate at least one of the plurality of sub-images to produce a first wavelet having a desired focal point, and
 wherein said wavelet encoder encodes at least one other of the plurality of sub-images at a second encoding rate that differs from the first encoding rate to produce a second wavelet having a corresponding at least one other sub-image with respect to said first wavelet.

2. The encoding system of claim 1, further including
 an image partitioner that partitions an image into the plurality of sub-images corresponding to the plurality of regions.

3. The encoding system of claim 1, wherein
 the display partitioner partitions the display area corresponding to a foveation effect.

4. The encoding system of claim 1, further including
 a sequencer that organizes elements of each of the plurality of wavelet encodings in dependence upon the parameters associated with each region.

5. A decoding system comprising:
 a wavelet decoder that
  receives a plurality of wavelet encodings,
  decodes at least one wavelet encoding of the plurality of wavelet encodings at a first decoding rate to produce a corresponding at least one sub-image having a desired focal point, and
  decodes at least one other wavelet encoding of the plurality of wavelet encodings at a second decoding rate that differs from the first decoding rate to produce a corresponding at least one other sub-image, and
 a display device, operably coupled to the wavelet decoder that renders an image comprising the at least one sub-image and the at least one other sub-image.

6. The decoding system of claim 5, further comprising
 a de-sequencer that receives a hierarchical wavelet encoding and produces therefrom the plurality of wavelet encodings.

7. The decoding system of claim 5, further comprising
 a display partitioner that partitions a display area into a plurality of partitions, wherein at least one partition is associated with the first decoding rate, and at least one other partition is associated with the second decoding rate.

8. The decoding system of claim 7, wherein
 the display partitioner partitions the display area to facilitate a foveation effect.

9. A method of encoding an image comprising:
 partitioning a display area into a plurality of partitions,
 encoding a plurality of sub-images hierarchically into a plurality of wavelet encodings based on the plurality of partitions to facilitate a subsequent decoding of the plurality of wavelet encodings at a plurality of decoding rates, wherein a first sub-image having a desired focal point of a particular sub-image of the plurality of sub-images is encoded into a first wavelet at a first encoding rate, and a second sub-image is encoded into a second wavelet at a second encoding rate that differs from the first encoding rate with respect to the first wavelet, so that said second wavelet corresponds to the second sub-image of the plurality of sub-images.

10. The method of claim 9, further comprising partitioning an image into the plurality of sub-images based on the plurality of partitions.

11. The method of claim 9, wherein the partitioning of the display area is based on a foveation effect.

12. The method of claim 9, further comprising arranging elements of each wavelet of the plurality of wavelet encodings into a sequence of elements based on the plurality of decoding rates.

13. The method of claim 12, further comprising truncating the sequence of elements to facilitate an optimized communication of the plurality of sub-images to a decoding device.

14. The method of claim 9, wherein the partitioning of the display area is hierarchical.

15. A method of decoding a plurality of wavelet encodings comprising:

decoding at least one wavelet encoding of the plurality of wavelet encodings at a first decoding rate to produce at least one first sub-image having a desired focal point, decoding at least one other wavelet encoding of the plurality of wavelet encodings at a second decoding rate to produce at least one second sub-image, and rendering an image comprising the at least one first sub-image and the at least one second sub-image, wherein the at least one first sub-image is displayed before the at least second sub-image.

16. The method of claim 15, further comprising de-sequencing a composite wavelet encoding to produce the plurality of wavelet encodings.

17. The method of claim 16, further comprising:

receiving the composite wavelet encoding from a remote site, and rendering the image while the composite wavelet encoding is being received.

18. The method of claim 15, further comprising displaying the image on a display device.

19. The method of claim 15, further comprising partitioning a display area into a plurality of partitions, wherein at least one partition of the plurality of partitions is associated with the first decoding rate and at least one other partition of the plurality of partitions is associated with the second decoding rate.

20. The method of claim 19, wherein the partitioning of the display area is based on a foveation effect.

* * * * *